(12) United States Patent
Boley et al.

(10) Patent No.: US 6,990,814 B2
(45) Date of Patent: Jan. 31, 2006

(54) ENGINE TURBOCHARGER CONTROL MANAGEMENT SYSTEM

(75) Inventors: William Christopher Boley, Lafayette, IN (US); Gary Nelson Boyer, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/737,739

(22) Filed: Dec. 18, 2003

(65) Prior Publication Data

US 2005/0132705 A1     Jun. 23, 2005

(51) Int. Cl.
   *F02B 33/44*   (2006.01)
   *F02D 23/00*   (2006.01)

(52) U.S. Cl. .......................................... 60/611; 60/602
(58) Field of Classification Search ................ 60/611, 60/600–603; 123/565
   See application file for complete search history.

(56) References Cited

U.S. PATENT DOCUMENTS

| | | | |
|---|---|---|---|
| 4,378,677 A | | 4/1983 | Zumstein |
| 4,774,812 A | | 10/1988 | Hitomi et al. ................ 60/611 |
| 5,025,629 A | * | 6/1991 | Woollenweber .............. 60/611 |
| 5,526,266 A | * | 6/1996 | Rutan et al. ................ 60/605.1 |
| 5,526,645 A | * | 6/1996 | Kaiser .......................... 60/611 |
| 5,551,236 A | | 9/1996 | Zimmer et al. |
| 5,694,899 A | | 12/1997 | Chvatal et al. |
| 5,724,813 A | | 3/1998 | Fenelon et al. |
| 5,850,738 A | * | 12/1998 | Hayashi ........................ 60/602 |
| 5,950,432 A | | 9/1999 | Zimmer et al. |
| 6,050,093 A | * | 4/2000 | Daudel et al. ................ 60/602 |
| 6,298,718 B1 | | 10/2001 | Wang ........................ 73/118.1 |
| 6,457,312 B2 | | 10/2002 | Fahringer et al. ............. 60/611 |
| 6,539,714 B1 | | 4/2003 | Wang .......................... 60/611 |
| 6,574,584 B2 | | 6/2003 | Yeung et al. |
| 6,698,203 B2 | * | 3/2004 | Wang .......................... 60/611 |
| 2003/0131596 A1 | * | 7/2003 | Sumser et al. ................ 60/611 |
| 2003/0182048 A1 | * | 9/2003 | Wang et al. ................ 701/107 |
| 2004/0006985 A1 | * | 1/2004 | Wild et al. .................... 60/611 |

FOREIGN PATENT DOCUMENTS

JP          03100398 A   *  4/1991

* cited by examiner

*Primary Examiner*—Thai-Ba Trieu
(74) *Attorney, Agent, or Firm*—Finnegan Henderson Farabow Garrett & Dunner, LLP

(57) ABSTRACT

A method of controlling a compressor includes measuring a pressure of fluid entering the compressor, measuring a pressure of fluid exiting the compressor, and measuring a rotational speed of the compressor. Signals indicative of the measured pressure of fluid entering the compressor, measured pressure of fluid exiting the compressor, and measured rotational speed of the compressor are sent to an electronic control unit. The operation of the compressor is controlled in response to at least the signal indicative of the measured rotational speed of the compressor received by the electronic control unit.

20 Claims, 2 Drawing Sheets

ENGINE TURBOCHARGER CONTROL MANAGEMENT SYSTEM

TECHNICAL FIELD

This invention relates generally to turbocharger systems for internal combustion engines, and more particularly to control management systems for turbocharger systems of internal combustion engines.

BACKGROUND

Turbocharger systems increase the power and efficiency of internal combustion engines by providing the engine with intake fluid at higher than atmospheric pressure. Conventional turbocharger systems include a turbine driven by exhaust energy from the engine, and a compressor driven by the turbine. The compressor pressurizes fluid, previously at or near atmospheric pressure, for travel through a throttle valve and aftercooler and into an engine intake manifold.

Controlling the turbocharger system to obtain desired engine operation has been a difficult problem. Under certain conditions, the driving speed of the compressor and intake fluid pressure can cause excessive compressor output, resulting in a compressor choke condition. When the compressor is operating in a choke condition, the fluid flow through the compressor is unsteady, characterized by fluid pulses followed by periods of interrupted fluid flow. Compressor choke decreases the efficiency and capability of the turbocharger system, which reduces the stability of the engine.

Under certain other conditions of the turbocharger system, the driving speed of the compressor and the pressure of the intake fluid can cause the compressor blade to rotate at speeds causing the intake fluid to separate from the compressor blade. This condition is known as compressor surge and results in high overspeeding of the compressor. Light compressor surge decreases the efficiency and capability of the turbocharger system, which reduces the stability of the engine. Hard compressor surge conditions can result in a relatively quick catastrophic failure of the turbocharger system.

U.S. Pat. No. 5,694,899 to Chvatal et al. attempts to eliminate the occurrence of compressor surge in a turbocharger system by providing a controlled bypass line connecting the turbocharger's compressor outlet line to the compressor inlet line. When the bypass line is opened, the mass flow rate of gas flowing through the compressor is increased and the pressure downstream of the compressor is reduced. The increase in mass flow rate of the gas and reduction in downstream pressure serves to avoid the surge condition. The disclosure of Chvatal et al., however, does not describe how the operating condition of the compressor is monitored to determine when the compressor is in a surge condition, or in danger of being in a surge condition, and thus when it is appropriate to open the bypass line.

Other conventional turbocharger systems determine the operating condition of the compressor by measuring various operational characteristics of the turbocharger system and engine, calculating a mass flow rate of fluid through the compressor, and comparing the measured and calculated values against a turbocharger control map. The turbocharger control map identifies, for example, when a surge condition will exist based on known values for a pressure ratio of the compressor and a mass flow of the compressor.

These conventional methods for determining the operating condition of a turbocharger system, however, are prone to inaccuracy due to the numerous measured values and equations required to determine the mass flow rate of a compressor. Further, such methods do not adequately compensate for atmospheric pressure variations among work sites.

The present invention provides a turbocharger control management system that avoids some or all of the aforesaid shortcomings in the prior art.

SUMMARY OF THE INVENTION

In accordance with one aspect of the disclosure, a method of controlling a compressor includes measuring a pressure of fluid entering the compressor, measuring a pressure of fluid exiting the compressor, and measuring a rotational speed of the compressor. Signals indicative of the measured pressure of fluid entering the compressor, measured pressure of fluid exiting the compressor, and measured rotational speed of the compressor are sent to an electronic control unit. The operation of the compressor is controlled in response to at least the signal indicative of the measured rotational speed of the compressor received by the electronic control unit.

According to another aspect of the present disclosure, a method of controlling a turbocharger system of an internal combustion engine includes supplying combustion chambers of the internal combustion engine with fluid exiting a compressor of the turbocharger system. Exhaust from the combustion chambers is supplied to a turbine of the turbocharger system. The method further includes driving the compressor at least in part by the turbine, measuring a rotational speed of the compressor, and controlling at least the pressure of fluid entering the compressor in response to the measured rotational speed of the compressor.

DETAILED DESCRIPTION

Figure 1:
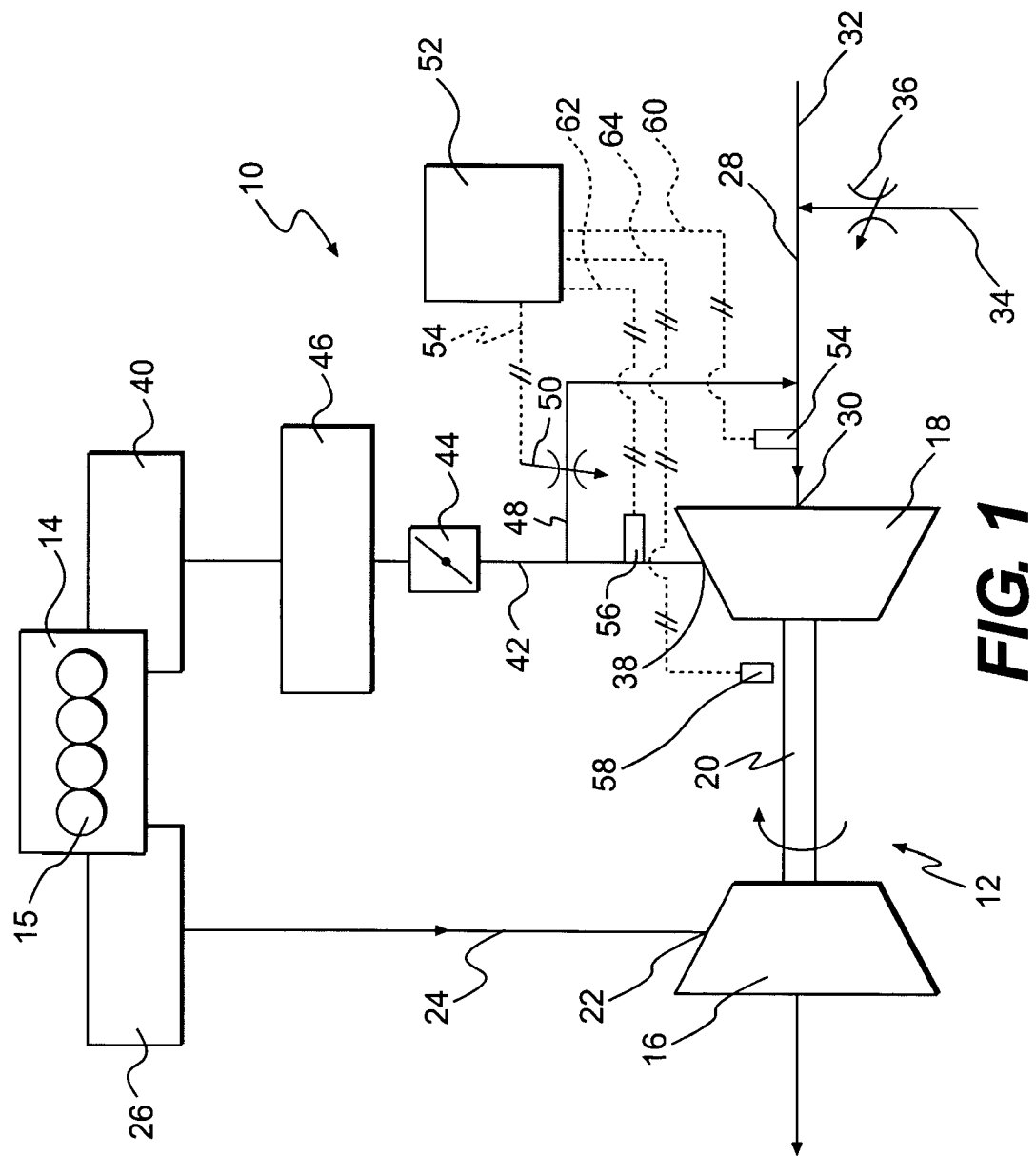
FIG. 1 is a schematic illustration of a turbocharger control management system according to an exemplary embodiment of the disclosure.

FIG. 1 illustrates a turbocharger control management system 10 according to the disclosure. The system 10 includes a turbocharger 12 fluidly coupled to an internal combustion engine 14 having combustion chambers 15. The internal combustion engine 14 may be of any conventional type, for example, the reciprocating internal combustion engine type such as a spark ignited or compression ignited engine. The internal combustion engine 14 may be used for any conventional application, such as for vehicular motive power, energy generation, or driving other mechanical equipment.

The turbocharger 12 includes a turbine 16 drivingly connected to a compressor 18 by way of, for example, a common rotatable shaft 20. The turbine 16 and compressor 18 may be of any conventional design, for example, of the axial or centrifugal flow type. The turbine 16 may include an inlet 22 fluidly coupled via exhaust line 24 to an exhaust manifold 26 of the internal combustion engine 14.

A compressor inlet line 28 is coupled to an inlet 30 of the compressor 18 of the turbocharger 12. In the example of a natural gas driven internal combustion engine 14, the compressor inlet line 28 may be coupled to an air inlet line 32 and a natural gas inlet line 34 having a flow control valve 36. The compressor 18 includes an outlet 38 in fluid communication with an intake manifold 40 of the internal combustion engine 14 by way of a compressor outlet line 42. The compressor outlet line 42 may include any number of conventional components, such as, for example, a throttle valve 44 and an aftercooler 46 located downstream of the throttle valve 44.

The turbocharger control management system 10 according to the disclosure may also include a compressor bypass line 48 coupled between the compressor outlet line 42 and the compressor inlet line 28. The bypass line 48 may include a flow control element in the form of, for example, a controllable bypass valve 50. The bypass valve 50 may be of any conventional design for providing controlled fluid flow through the bypass line 48. For example, bypass valve 50 may be of the on-off-type providing a constant flow rate therethrough, or may be of the variable-orifice-type controlling the flow rate through the bypass valve 50 (as shown in FIG. 1). As will be described in more detail below, the bypass valve 50 may be controlled by signals received from an electronic control module or unit 52 through a bypass control line 54. The electronic control module 52 may be a localized controller serving only to control the bypass valve 50, or may be a more generalized controller monitoring and controlling various components of the system 10 and/or components outside the turbocharger control management system 10.

The electronic control module 52 may be coupled to a plurality of sensors arranged to measure various operational characteristics of the system 10. The sensors may include a compressor inlet pressure sensor 54 coupled to the compressor inlet line 28 for measuring the pressure adjacent the inlet 30 of the compressor 18; a compressor outlet pressure sensor 56 coupled to the compressor outlet line 42 for measuring the pressure adjacent the outlet 38 of the compressor 18; and a turbo speed sensor 58 arranged with the common shaft 20 of the turbocharger 12 for measuring the rotational speed of the compressor 18. Each of the sensors 54, 56, 58, include a respective control line (60, 62, 64) connecting the sensors to the electronic control module 52. It is understood that each of the sensors 54, 56, and 58 may be of any conventional design and may be coupled to the system 10 in any conventional manner. Further, additional sensors may be coupled to the electronic control module 52 for monitoring other characteristics of the system 10.

The electronic control module 52 includes a compressor performance map 70 for assisting in controlling the operation of the bypass valve 50. The compressor performance map 70 is detailed in FIG. 2 and includes performance data of the compressor 18 itself and of the compressor's operation as a component in the turbocharger control management system 10. The map 70 may be stored in memory of the electronic control module 52, or may be otherwise accessible to the electronic control module 52 in any conventional manner.

Figure 2:
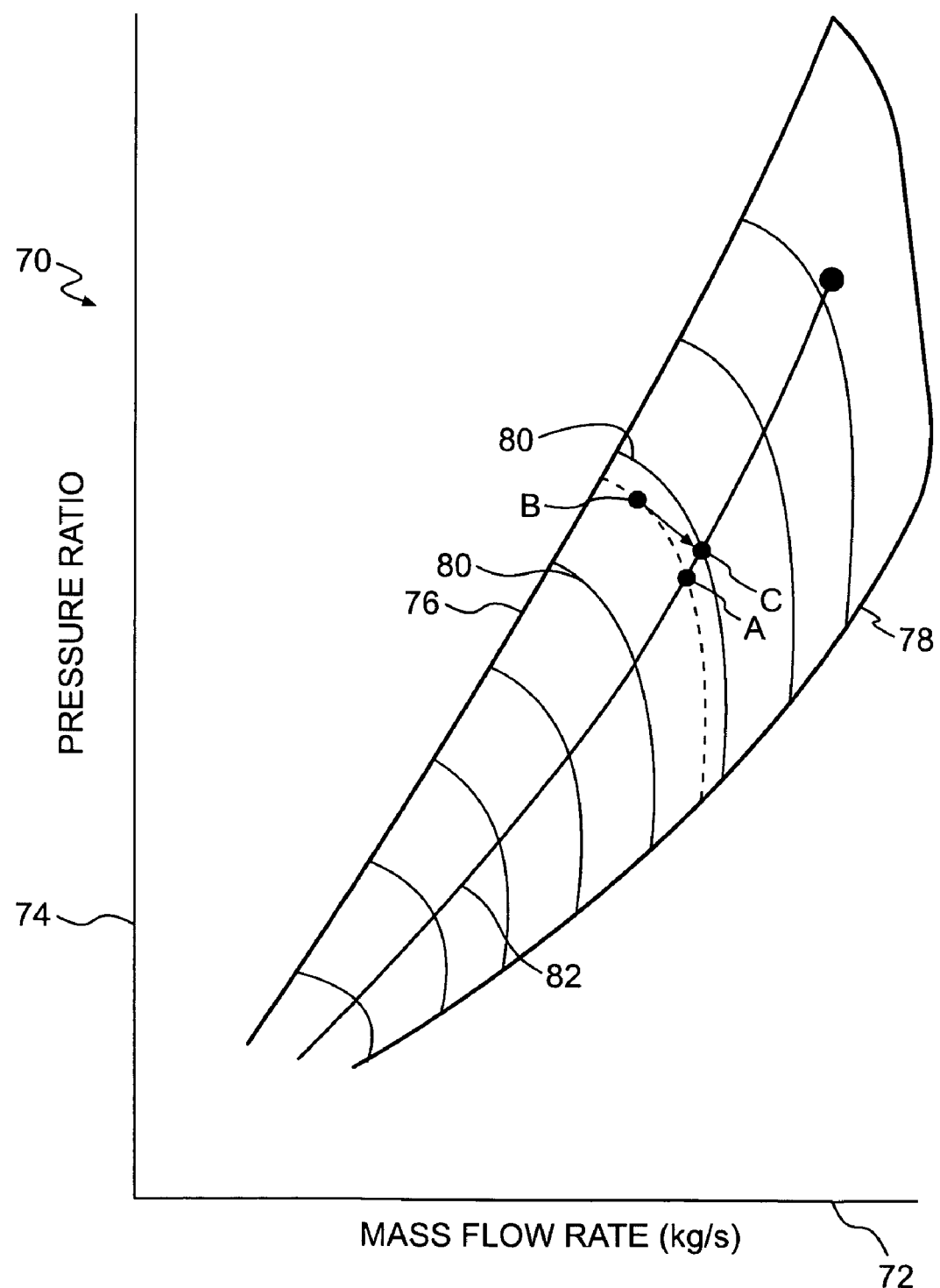
FIG. 2 is a compressor performance map in accordance with the turbocharger control management system of FIG. 1.

Referring to FIG. 2, the abscissa 72 of the compressor performance map 70 is the mass flow rate of fluid through the compressor, for example in kg/sec., and the ordinate 74 is the compressor pressure ratio. The pressure ratio of the compressor 18 corresponds to a ratio of the pressure of the fluid exiting the compressor 18 to the pressure of the fluid entering the compressor 18. The operational boundaries of the compressor 18 are represented by a surge line 76 and a choke line 78 for a range of pressure ratios and air flow rates. The surge line 76, sometimes called a stability limit, pumping limit, or stall line, is a curved line 76 that increases with pressure ratio and compressor mass flow rate. The area to the right of the surge line 76 and to the left of choke line 78 in FIG. 2 includes a range of pressure ratios and mass flow rates in which the compressor operation is stable. If the pressure ratio and mass flow rate converge on the left side of the surge line 76, the operation of the compressor is unstable, characterized by rapid fluid pressure fluctuations within the compressor 18.

Compressor performance map 70 may also include turbo speed lines 80. The turbo speed lines 80 identify the relationship of the compressor pressure ratio and mass flow rate at different rotational speeds of the compressor 18.

The surge, choke, and turbo speed lines 76, 78, 80 are determined from empirical data of the compressor 18 in the form of fixed data points taken and tabulated from compressor performance tests. The surge, choke, and turbo speed lines 76, 78, 80 are operational characteristics of the compressor 18 itself, independent of the operation of the turbocharger control management system 10. Because a plurality of data points are used as a basis for the surge, choke, and turbo speed lines 76, 78, 80, interpolation of the areas between the data points may be performed by the electronic control module 52.

The compressor performance map 70 also includes a desired compressor operation line 82. The operation line 82 represent the optimum pressure ratio and mass flow rate of the compressor 18 for a particular speed of the compressor 18, taking into account an adequate operational margin from the surge and choke lines 76, 78. In contrast to the surge, choke, and turbo speed lines 76, 78, 80, which are based on the operation compressor 18 only, operation line 82 is determined through testing and development of the overall operation of the turbocharger control management system 10. The operation line 82 may be mapped at a predefined altitude and ambient temperature, for example 150 m and 25 degrees Celsius. In addition and as shown in the map 70, the operation line 82 may be mapped for the full range of compressor speeds, i.e. compressor idle to the full rated load speed of the compressor 18.

INDUSTRIAL APPLICABILITY

Referring now to the operation of the turbocharger control management system 10. An air and natural gas mixture is fed through compressor inlet line 28 to the inlet 30 of compressor 18. The mixture is then compressed within compressor 18 and delivered through the throttle valve 44, aftercooler 46, intake manifold 40, and into the engine 14 by way of compressor outlet line 42. The aftercooler 46 reduces the temperature of the fluid mixture that has been heated by compression in compressor 18. The pressurized fluid mixture received in the engine 14 increases the performance of the engine 14 by supplying the engine cylinders 15 with the fluid mixture at an elevated pressure and density.

Exhaust gasses from the engine 14 flow out the exhaust manifold 26 and through the exhaust line 24 into the turbine 16. The heat and pressure energy of the exhaust gases drive the turbine 16. The turbine 16, in turn, drives the compressor 18 by way of the common shaft 20.

During operation of the turbocharger 12, inlet pressure sensor 54, outlet pressure sensor 56, and compressor speed sensor 58 measure their respective operational characteristics of the turbocharger 12. Signals indicative of the measured characteristics are sent along control lines 60, 62, and 64 to electronic control module 52. The electronic control module 52 then determines the point on the desired compressor operation line 82 corresponding to the measured compressor speed (where the appropriate turbo speed line 80 intersects the desired compressor operation line 82). The electronic control module 52 then calculates the pressure ratio based on the signals received from the compressor inlet and outlet pressure sensors 54, 56, and compares the calculated pressure ratio to the pressure ratio on the operation line 82 at the measured turbo speed.

If the measured pressure ratio is greater than the pressure ratio of the desired compressor operation line 82 at the measured turbo speed, corresponding to a point to the left of the desired operation line 82, then a signal is sent to the bypass valve 50 to open the bypass line 48 and provide compressed fluid from the compressor outlet line 42 to the compressor inlet line 28. Bypassing compressed fluid back to the compressor inlet line 28 acts to increase the fluid pressure at the inlet 30 of the compressor 18 and, thus, reduce the pressure ratio of the compressor 18. Reducing the pressure ratio acts to pull the pressure ratio back toward the desired operation line 82 and away from the surge line 76.

To exemplify the control of the bypass valve 50, reference is made to points A, B, and C of FIG. 2. Point A represents a point on the desired compressor operation line 82 corresponding to a turbo speed of the compressor 18 measured by turbo speed sensor 58. Point B represents the pressure ratio calculated based on the signals received from compressor inlet pressure sensor 54 and compressor outlet pressure sensor 56. As shown, the calculated pressure ratio (point B) is greater than the optimum pressure ratio at the measured turbo speed (point A), indicating an operating condition undesirably close to the surge line 76. Accordingly, the electronic control module 52 sends a signal to bypass valve 50 along bypass control line 48 to open the bypass line 48 to permit the pressurized fluid mixture to flow from the compressor outlet line 42 to the compressor inlet line 28. This operation causes the pressure ratio of the compressor 18 to drop, and the turbo speed to increase, and therefore approach the operating point depicted by the desired compressor operation line 82. The bypass valve 50 may be closed when the measured pressure ratio corresponds to point C sufficiently close to the desired compressor operation line 82.

The turbocharger control management system 10 serves to maintain the operation of the compressor 18 within a desired range based on the operation line 82. Maintaining the compressor 18 within a desired operation range avoids detrimental surge conditions and increases the overall efficiency of the turbocharger 12, and consequently of the engine 14. This is especially beneficial in large highly boosted engines, where the operation margin between the surge and optimum condition is normally smaller than in other engines.

In addition, the turbocharger management system 10 of the present disclosure avoids the inaccuracies and complexities associated with determining surge and choke based on calculations of the mass flow rate of the compressor 18. As explained above, the turbocharger control management system 10 of the present disclosure avoids surge conditions by monitoring the speed of the compressor by turbo speed sensor 58 and the pressure ratio of the compressor 18 by compressor inlet and outlet pressure sensors 54, 56.

Other embodiments of the invention will be apparent to those skilled in the art from consideration of the specification and practice of the invention disclosed herein. For example, bypass valve 50 may be configured as a variable orifice valve and provide a steady bypass during the operation of the turbocharger 12, so that if the measured pressure ratio is to the right of the operating line 82 in compressor performance map 70, corresponding to pressure ratio lower than desired, the bypass line can be closed to increase the pressure ratio and pull the compressor back up to the operating line 82. Such control of the turbocharger 12 acts to avoid a choke condition of the compressor 18. In addition, the engine turbocharger management system may be used with various different types of engines, such as diesel and gasoline engines, and engines of varying size. It is intended that the specification and examples be considered as exemplary only, with a true scope of the invention being indicated by the following claims.

What is claimed is:

1. A method of controlling a compressor, comprising:
   measuring a pressure of fluid entering the compressor;
   measuring a pressure of fluid exiting the compressor;
   measuring rotational speed of the compressor;
   sending signals indicative of the measured pressure of fluid entering the compressor, measured pressure of fluid exiting the compressor, and measured rotational speed of the compressor to an electronic control unit; and
   controlling the operation of the compressor in response to at least the signal indicative of the measured rotational speed of the compressor received by the electronic control unit, wherein the controlling of the operation of the compressor includes bypassing fluid exiting the compressor to an inlet line of the compressor.

2. The method of controlling a compressor according to claim 1, wherein the controlling of the operation of the compressor includes adjusting the pressure of the fluid entering the compressor.

3. The method of controlling a compressor according to claim 1, wherein the controlling of the operation of the compressor includes adjusting at least one of the rotational speed of the compressor, the pressure of fluid entering the compressor, and the pressure of fluid exiting the compressor to avoid a surge condition of the compressor.

4. The method of controlling a compressor according to claim 3, further including calculating a measured pressure ratio corresponding to a ratio of the measured pressure of fluid exiting the compressor to the measured pressure of fluid entering the compressor; and comparing the measured pressure ratio to a desired pressure ratio.

5. The method of controlling a compressor according to claim 4, wherein the desired pressure ratio is a function of the measured rotational speed of the compressor.

6. The method of controlling a compressor according to claim 1, further including controlling the operation of the compressor in response to the signal indicative of the measured pressure of fluid entering the compressor and the signal indicative of the measured pressure of fluid exiting the compressor received by the electronic control unit.

7. The method of controlling a compressor according to claim 6, further including comparing the signal indicative of the measured pressure of fluid entering the compressor and the signal indicative of the measured pressure of fluid exiting the compressor to a desired pressure of fluid entering the compressor and a desired pressure of fluid exiting the compressor.

8. The method of controlling a compressor according to claim 1, further including supplying an internal combustion engine with fluid exiting the compressor.

9. The method of controlling a compressor according to claim 1, wherein the measuring of the rotational speed of the compressor includes measuring a rotational speed of a shaft connecting a turbine to the compressor.

10. A method of controlling a compressor, comprising:
    measuring a pressure of fluid entering the compressor;
    measuring a pressure of fluid exiting the compressor;

measuring a rotational speed of the compressor;

sending signals indicative of the measured pressure of fluid entering the compressor, measured pressure of fluid exiting the compressor, and measured rotational speed of the compressor to an electronic control unit; and controlling the operation of the compressor in response to at least the signal indicative of the measured rotational speed of the compressor received by the electronic control unit, wherein the controlling of the operation of the compressor includes adjusting at least one of the rotational speed of the compressor, the pressure of fluid entering the compressor, and the pressure of fluid exiting the compressor to avoid a choke condition of the compressor.

11. A method of controlling a compressor, comprising:

measuring a pressure of fluid entering the compressor;

measuring a pressure of fluid exiting the compressor;

measuring a rotational speed of the compressor;

sending signals indicative of the measured pressure of fluid entering the compressor, measured pressure of fluid exiting the compressor, and measured rotational speed of the compressor to an electronic control unit; and controlling the operation of the compressor in response to at least the signal indicative of the measured rotational speed of the compressor received by the electronic control unit, wherein the fluid entering the compressor includes natural gas.

12. A method of controlling a turbocharger system of an internal combustion engine having a plurality of combustion chambers, comprising:

supplying the combustion chambers of the internal combustion engine with fluid exiting a compressor of the turbocharger system;

supplying exhaust from the combustion chambers to a turbine of the turbocharger system;

driving the compressor at least in part by the turbine;

measuring a rotational speed of the compressor; and controlling at least the pressure of fluid entering the compressor in response to the measured rotational speed of the compressor, wherein the controlling of the pressure of fluid entering the compressor includes bypassing fluid exiting the compressor to an inlet line of the compressor.

13. The method of controlling a turbocharger system according to claim 12, wherein the controlling of the pressure of the fluid entering the compressor is initiated to avoid at least one of a surge and choke condition of the compressor.

14. The method of controlling a turbocharger system according to claim 12, further including controlling the pressure of the fluid entering the compressor in response to measuring the pressure of the fluid entering the compressor and measuring the pressure of the fluid exiting the compressor.

15. The method of controlling a turbocharger system according to claim 14, further including comparing the measured pressure of fluid entering the compressor and measured pressure of fluid exiting the compressor to a desired pressure of fluid entering the compressor and a desired pressure of fluid exiting the compressor.

16. The method of controlling a turbocharger system according to claim 15, further including calculating a measured pressure ratio corresponding to a ratio of the measured pressure of fluid exiting the compressor to the measured pressure of fluid entering the compressor; and comparing the measured pressure ratio to a desired pressure ratio.

17. The method of controlling a turbocharger system according to claim 16, wherein the desired pressure ratio is a function of the measured rotational speed of the compressor.

18. The method of controlling a turbocharger system according to claim 12, wherein the measuring of the rotational speed of the compressor includes measuring a rotational speed of a shaft connecting the turbine to the compressor.

19. A method of controlling a turbocharger system of an internal combustion engine having a plurality of combustion chambers, comprising:

supplying the combustion chambers of the internal combustion engine with fluid exiting a compressor of the turbocharger system;

supplying exhaust from the combustion chambers to a turbine of the turbocharger system;

driving the compressor at least in part by the turbine;

measuring a pressure of fluid entering the compressor;

measuring a pressure of fluid exiting the compressor;

measuring a rotational speed of the compressor; and controlling the operation of the compressor in response to the measured rotational speed of the compressor, the measured pressure of fluid entering the compressor, and the measured pressure of fluid exiting the compressor, wherein controlling of the operation of the compressor includes adjusting at least one of the rotational speed of the compressor, the pressure of fluid entering the compressor, and the pressure of fluid exiting the compressor to avoid a surge condition of the compressor by bypassing fluid exiting the compressor to an inlet line of the compressor.

20. The method of controlling a turbocharger system according to claim 19, wherein the fluid entering the compressor includes natural gas.

* * * * *